United States Patent
Aydin

(10) Patent No.: US 9,008,588 B2
(45) Date of Patent: Apr. 14, 2015

(54) SYSTEM AND METHOD FOR THE CALIBRATION AND VERIFICATION OF WIRELESS NETWORKS WITH CONTROL NETWORK

(71) Applicant: International Business Machines Corporation, Armonk, NY (US)

(72) Inventor: Adem G. Aydin, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/898,566

(22) Filed: May 21, 2013

(65) Prior Publication Data

US 2014/0349585 A1 Nov. 27, 2014

(51) Int. Cl.
- H04B 17/00 (2006.01)
- H04B 15/00 (2006.01)
- H04W 24/06 (2009.01)

(52) U.S. Cl.
CPC .................................... *H04W 24/06* (2013.01)

(58) Field of Classification Search
USPC ............ 455/63.1, 67.11, 67.12, 67.13, 67.14, 455/500, 501; 370/338
See application file for complete search history.

(56) References Cited

U.S. PATENT DOCUMENTS

| | | | |
|---|---|---|---|
| 6,037,898 A | 3/2000 | Parish et al. | |
| 6,157,343 A | 12/2000 | Andersson et al. | |
| 6,230,018 B1 | 5/2001 | Watters et al. | |
| 6,486,832 B1 | 11/2002 | Abramov et al. | |
| 6,687,503 B1 * | 2/2004 | Porter et al. | 455/452.1 |
| 7,146,170 B2 | 12/2006 | Davidson | |
| 7,221,268 B2 | 5/2007 | Sayers et al. | |
| 7,822,398 B2 | 10/2010 | Roberts | |
| 8,271,042 B2 | 9/2012 | Guey | |
| 8,285,221 B2 | 10/2012 | Kundmann et al. | |
| 2004/0037258 A1 * | 2/2004 | Scherzer et al. | 370/338 |

(Continued)

FOREIGN PATENT DOCUMENTS

| | | |
|---|---|---|
| EP | 1 071 228 A1 | 1/2001 |
| EP | 1 875 615 B1 | 7/2011 |

OTHER PUBLICATIONS

Ramachandran, et al., "60 GHz Data-Center Networking: Wireless → Worry Less?," pp. 1-11.

(Continued)

*Primary Examiner* — Quochien B Vuong
(74) *Attorney, Agent, or Firm* — Gibb & Riley, LLC; Michael J. LeStrange, Esq.

(57) ABSTRACT

In a system and method computerized devices are connected to each other over a wireless network and to a controller over an additional network. The devices perform antenna beam angle testing of the wireless network. The controller receives, over the additional network, transmitted and received test signal data acquired during such testing. Based on the test signal data, the controller calculates calibration data, which indicates, for each pair of devices, different path loss amounts associated with different transmitted test signal beam angles and a single transmitted test signal power level. The controller generates calibration matrices corresponding to each pair of devices using the calibration data; analyzes the matrices to determine, for each pair, an optimal antenna beam angle that results in the least amount of path loss; determines an optimal power level for the pair based on the path loss; and communicates the optimal specifications to the pair.

20 Claims, 8 Drawing Sheets

(56) References Cited

U.S. PATENT DOCUMENTS

| | | |
|---|---|---|
| 2004/0106436 A1 | 6/2004 | Ochi et al. |
| 2006/0056532 A1 | 3/2006 | Li et al. |
| 2008/0065247 A1 | 3/2008 | Igoe |
| 2009/0075615 A1 | 3/2009 | Roberts |
| 2009/0093222 A1 | 4/2009 | Sarkar |
| 2009/0098824 A1 | 4/2009 | Rofougaran et al. |
| 2010/0232483 A1 | 9/2010 | Zhang et al. |
| 2010/0271992 A1 | 10/2010 | Wentink et al. |
| 2010/0273431 A1 | 10/2010 | Fraser et al. |
| 2011/0068971 A1 | 3/2011 | Kusyk |
| 2012/0038513 A1 | 2/2012 | Li et al. |
| 2013/0078926 A1 | 3/2013 | Bouillet |

OTHER PUBLICATIONS

Zhang, et al., "3D Beamforming for Wireless Data Centers," ACM 978-1-4503-1059-8/11/11, Nov. 11-15, 2011, pp. 1-6.

IEEE P802.11ad/D0.1, "Enhancemwnts for Very High Throughput in the 60GHz Band," Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6, Jun. 2010, pp. 1-357.

* cited by examiner

200A

Calibration Matrix With Beam Angle To Path Loss Data For Device 110a

|  | Path Loss (# dBm or dBW) @ Device 110b | Path Loss (# dBm or dBW) @ Device 110c | Power Level (# dBm or dBW) @ Device 110d |
|---|---|---|---|
| Beam Angle 1 (# degrees) |  |  |  |
| Beam Angle 2 (# degrees) |  |  |  |
| Beam Angle 3 (# degrees) |  |  |  |
| Beam Angle m (# degrees) |  |  |  |

Calibration Matrix With Beam Angle To Path Loss Data For Device 110b

|  | Path Loss (# dBm or dBW) @ Device 110a | Path Loss (# dBm or dBW) @ Device 110c | Path Loss (# dBm or dBW) @ Device 110d |
|---|---|---|---|
| Beam Angle 1 (# degrees) |  |  |  |
| Beam Angle 2 (# degrees) |  |  |  |
| Beam Angle 3 (# degrees) |  |  |  |
| Beam Angle m (# degrees) |  |  |  |

FIG. 2B

200C → Calibration Matrix With Beam Angle To Path Loss Data For Device 110c

|  | Path Loss (# dBm or dBW) @ Device 110a | Path Loss (# dBm or dBW) @ Device 110b | Path Loss (# dBm or dBW) @ Device 110d |
|---|---|---|---|
| Beam Angle 1 (# degrees) |  |  |  |
| Beam Angle 2 (# degrees) |  |  |  |
| Beam Angle 3 (# degrees) |  |  |  |
| Beam Angle m (# degrees) |  |  |  |

FIG. 2C

200D → Calibration Matrix With Beam Angle To Path Loss Data For Device 110d

|  | Path Loss (# dBm or dBW) @ Device 110a | Path Loss (# dBm or dBW) @ Device 110b | Path Loss (# dBm or dBW) @ Device 110c |
|---|---|---|---|
| Beam Angle 1 (# degrees) |  |  |  |
| Beam Angle 2 (# degrees) |  |  |  |
| Beam Angle 3 (# degrees) |  |  |  |
| Beam Angle m (# degrees) |  |  |  |

FIG. 2D

SYSTEM AND METHOD FOR THE CALIBRATION AND VERIFICATION OF WIRELESS NETWORKS WITH CONTROL NETWORK

BACKGROUND

The systems, methods and computer program products disclosed herein relate to wireless networks and, more specifically, to using a controller to calibrate specifications (e.g., antenna beam angles and transmission power levels) for wireless communications between pairs of computerized devices connected to a wireless network.

Those skilled in the art will recognize that, as the number of computerized devices required to be connected to a wired network increases (e.g., in homes, offices, data centers, etc.), so does the complexity of the wiring involved. The option to replace a wired network with a wireless network has been limited, particularly, when the required data transfer amount between the computerized devices is high. However, recently, the development of high frequency (e.g., 60 GHz or any other high-frequency license-free radio frequency) wireless networks capable of multi-gigabit wireless data transfers has made the replacement of wired networks with wireless networks practical. Computerized devices connected to a high frequency wireless network typically incorporate transceivers coupled to antennas (e.g., horn or beam-forming array antennas) that allow for wireless communications and, particularly, multi-gigabit wireless data transfers between the computerized devices through, for example, line of sight (LOS) signal transmissions. In this case, the specifications (e.g., the antenna beam angles and/or the transmission signal power levels) used by the computerized devices must be calibrated to ensure that the intended computerized devices receive the wireless communications, thereby making proper calibration of those wireless communication specifications essential to overall network performance. Unfortunately, current techniques for calibrating the wireless communications specifications require a significant amount of processing power, are time-consuming and are non-scalable.

SUMMARY

In view of the foregoing, disclosed herein is a communication system enabled for calibrating wireless signal transmission-reception specifications. Specifically, the system can comprise computerized devices, which are connected to a wireless network (e.g., a high frequency wireless network), and a controller in communication with the computerized devices over an additional network (e.g., a wired network or a lower frequency wireless network). The computerized devices can perform antenna beam angle testing of the wireless network in order to acquire transmitted and received test signal data. The controller can receive the transmitted and received test signal data from the computerized devices over the additional network. The controller can further calculate calibration data, based on the transmitted and received test signal data. This calibration data can indicate, for each pair of computerized devices, different path loss amounts associated with different transmitted test signal beam angles and a single transmitted test signal power level. The controller can further generate calibration matrices corresponding to each of the computerized devices using the calibration data and can analyze the calibration matrices to determine, for each pair, an optimal antenna beam angle that will result in the least amount of path loss during wireless communication between the pair. The controller can also determine an optimal power level for the pair based on the path loss. The controller can further communicate the optimal antenna beam angle and the optimal power level back to each of the computerized devices in the pair. These computerized devices can subsequently communicate with each other over the wireless network using the specifications (i.e., the optimal antenna beam angle and optimal power level) provided by the controller. Also disclosed herein is an associated method and computer program product for calibrating such wireless signal transmission-reception specifications.

More particularly, disclosed herein is a communication system enabled for calibrating wireless signal transmission-reception specifications.

This system can comprise multiple computerized devices and a controller. The computerized devices can be connected to a wireless network (e.g., a high frequency, high bandwidth, wireless network). Specifically, the computerized devices can comprise transceivers coupled to antennas (e.g., horn or beam-forming array antennas) that allow for wireless communications and, particularly, multi-gigabit wireless data transfers between the computerized devices over the wireless network through, for example, line of sight (LOS) signal transmissions. The computerized devices also can each be connected to the controller via an additional network (e.g., a wired network or a second wireless network, such as a low frequency, low bandwidth, wireless network).

The computerized devices can perform antenna beam angle testing of the wireless network in order to acquire transmitted test signal data and corresponding received test signal data. Specifically, in antenna beam angle testing, one computerized device transmits a signal at a given power level (i.e., a single transmitted test signal power level), but varies the signal beam angle. That is, the test signal is transmitted using a range of different transmitted test signal beam angles. The other computerized devices on the wireless network can receive the test signal and can measure the different received test signal power levels associated with the different transmitted test signal beam angles. This process can be repeated by each of the computerized devices. The results and, particularly, the transmitted test signal data (i.e., the power level and different beam angles of the transmitted test signal from a transmitting computerized device) and the received test signal data (i.e., the measured power levels of the received test signal at the receiving computerized devices given the different beam angles) can be forwarded to the controller over the additional network.

The controller can receive the transmitted test signal data and the received test signal data from the computerized devices over the additional network and, based thereon, can calculate calibration data for wireless communications between pairs of the computerized devices within the wireless network. This calibration data can indicate, for each of the pairs, different path loss amounts associated with different transmitted test signal beam angles and a single transmitted test signal power level. The controller can further generate calibration matrices corresponding to each of the computerized devices using the calibration data and can analyze the calibration matrices to determine, for each pair, a specific antenna beam angle and, more particularly, an optimal antenna beam angle that will result in the least amount of path loss during wireless communication between the pair. The controller can further communicate the specific antenna beam angle to each of the computerized devices in the pair over the additional network. In addition, the controller can select a specific power level for the pair and, more particularly, an optimal power level for wireless communications between the pair. The optimal power level can be selected such that it is sufficiently high to ensure signal reception given the expected path loss, such that it is higher than a predetermined noise floor and such that it is lower than a predetermined maximum radiation level. As with the optimal antenna beam angle, the controller can communicate this optimal power level to each of the computerized devices in the pair over the additional network.

The computerized devices can subsequently communicate with each other over the wireless network using the wireless signal transmission-reception specifications (i.e., the optimal antenna beam angle and optimal power level) provided by the controller.

Also disclosed herein is a method for calibrating wireless signal transmission-reception specifications for multiple computerized devices connected to a wireless network (e.g., a high frequency, high bandwidth, wireless network).

The computerized devices can incorporate transceivers coupled to antennas (e.g., horn or beam-forming array antennas) that allow for wireless communications and, particularly, multi-gigabit wireless data transfers between the computerized devices on the wireless network through, for example, line of sight (LOS) signal transmissions. The computerized devices can also each be connected to a controller via an additional network (e.g., a wired network or a second wireless network, such as a low frequency, low bandwidth, wireless network).

The computerized devices can perform antenna beam angle testing of the wireless network in order to acquire transmitted test signal data and received test signal data. Specifically, in antenna beam angle testing, one computerized device transmits a test signal at a given power level (i.e., a single transmitted test signal power level), but varies the signal beam angle. That is, the test signal is transmitted using a range of different transmitted test signal beam angles. The other computerized devices on the wireless network can receive the test signal and can measure the different received test signal power levels associated with the different transmitted test signal beam angles. This process can be repeated by each of the computerized devices. The results and, particularly, the transmitted test signal data (i.e., the power level and different beam angles of the transmitted test signal from a transmitting computerized device) and the received test signal data (i.e., the measured power levels of the received test signal at the receiving computerized devices given the different beam angles) can be forwarded to the controller over the additional network.

The method can comprise receiving, by the controller, the transmitted test signal data and the received test signal data from the computerized devices over the additional network and calculating, by the controller based on the transmitted test signal data and the received test signal data, calibration data for wireless communications between pairs of the computerized devices within the wireless network. This calibration data can indicate, for each of the pairs, different path loss amounts associated with different transmitted test signal beam angles and a single transmitted test signal power level.

Next, the method can comprise generating, by the controller using the calibration data, calibration matrices corresponding to each of the computerized devices. The method can further comprise analyzing, by the controller, the calibration matrices to determine, for each pair, a specific antenna beam angle and, more particularly, an optimal antenna beam angle that will result in the least amount of path loss during wireless communication between the pair. This specific antenna beam angle can then be communicated, by the controller, to each of the computerized devices in the pair over the additional network. In addition, the method can comprise selecting, by the controller, a specific power level for the pair and, more particularly, an optimal power level for wireless communications between the pair. The optimal power level can be selected such that it is sufficiently high to ensure signal reception given the expected path loss, such that it is higher than a predetermined noise floor and such that it is lower than a predetermined maximum radiation level. As with the optimal antenna beam angle, this optimal power level can be communicated by the controller to each of the computerized devices in the pair over the additional network.

Communication between the computerized devices can subsequently be performed over the wireless network using the wireless signal transmission-reception specifications (i.e., the optimal antenna beam angle and optimal power level) provided by the controller.

Also, disclosed herein is a computer program product. This computer program product can comprise a computer readable storage medium. The computer readable storage medium can store instructions that are executable by a computer to perform the above-described method for calibrating wireless signal transmission-reception specifications for multiple computerized devices connected to a wireless network (e.g., a high frequency, high bandwidth, wireless network).

BRIEF DESCRIPTION OF THE DRAWINGS

The systems, methods and computer program products disclosed herein will be better understood from the following detailed description with reference to the drawings, which are not necessarily drawn to scale and in which:

FIGS. 2A-2D are tables illustrating exemplary calibration matrices corresponding to the computerized devices 110a-d in the system of FIG. 1;

DETAILED DESCRIPTION

Figure 1:
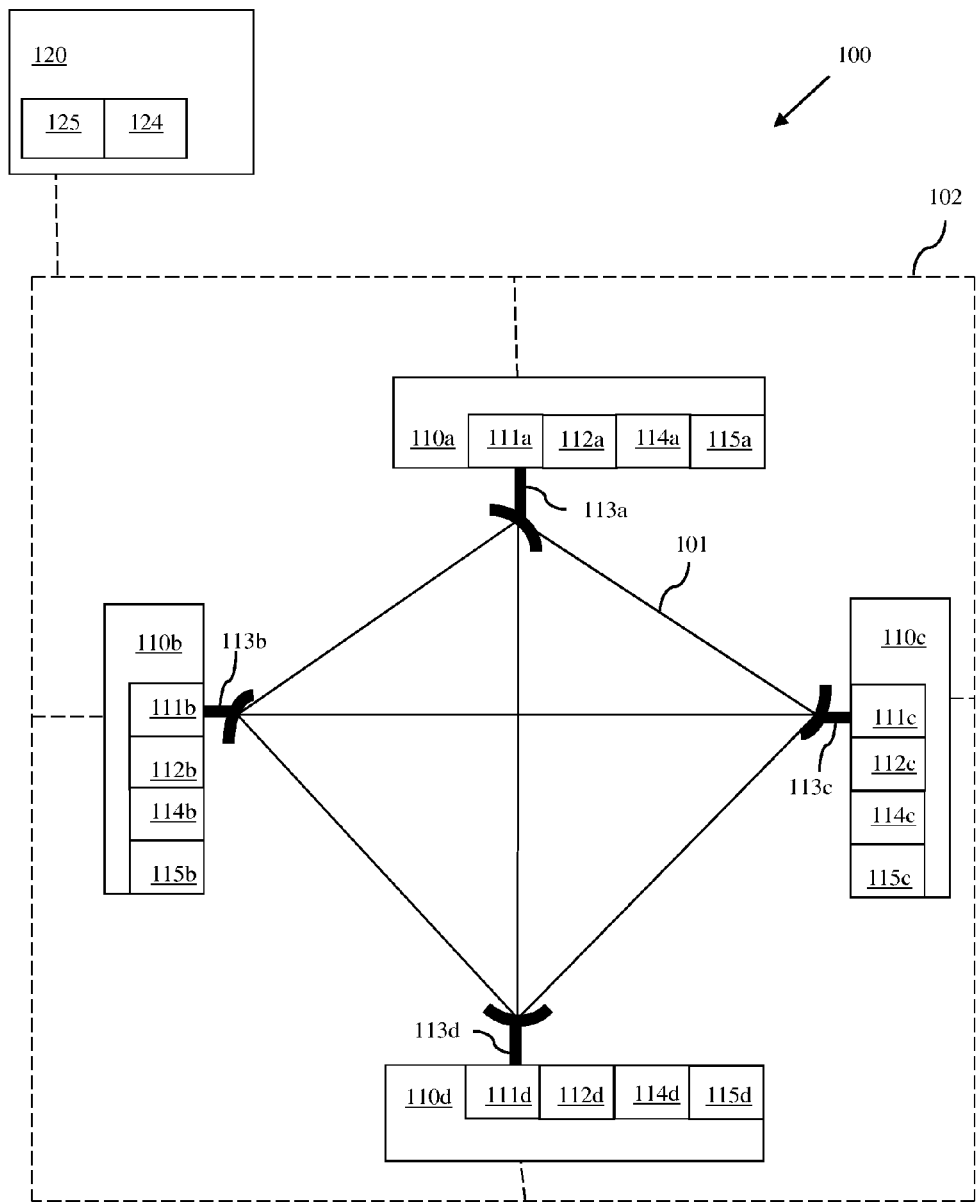
FIG. 1 is a schematic diagram illustrating a communication system enabled for calibrating wireless signal transmission-reception specifications.

As mentioned above, those skilled in the art will recognize that, as the number of computerized devices required to be connected to a wired network increases (e.g., in homes, offices, data centers, etc.), so does the complexity of the wiring. The option to replace a wired network with a wireless network has been limited, particularly, when the data transfer amount between the computerized devices is high. However, recently, the development of high frequency (e.g., 60 GHz or any other high-frequency license-free radio frequency) wireless networks capable of multi-gigabit wireless data transfers has made the replacement of wired networks with wireless networks practical. Computerized devices connected to a high frequency wireless network typically incorporate transceivers coupled to antennas (e.g., horn or beam-forming array antennas) that allow for wireless communications and, particularly, multi-gigabit wireless data transfers between the computerized devices through, for example, line of sight (LOS) signal transmissions. In this case, the specifications (e.g., the antenna beam angles and/or the transmission signal power levels) used by the computerized devices must be calibrated to ensure that the intended computerized devices receive the wireless communications, thereby making proper calibration of those wireless communication specifications essential to overall network performance. Unfortunately, current techniques for calibrating the wireless communications specifications require a significant amount of processing power, are time-consuming and are non-scalable.

In view of the foregoing, disclosed herein is a communication system enabled for calibrating wireless signal transmission-reception specifications. Specifically, the system can comprise computerized devices, which are connected to a wireless network (e.g., a high frequency wireless network), and a controller in communication with the computerized devices over an additional network (e.g., a wired network or a lower frequency wireless network). The computerized devices can perform antenna beam angle testing of the wireless network in order to acquire transmitted and received test signal data. The controller can receive the transmitted and received test signal data from the computerized devices over the additional network. The controller can further calculate calibration data, based on the transmitted and received test signal data. This calibration data can indicate, for each pair of computerized devices, different path loss amounts associated with different transmitted test signal beam angles and a single transmitted test signal power level. The controller can then generate calibration matrices corresponding to each of the computerized devices using the calibration data and can analyze the calibration matrices to determine, for each pair, an optimal antenna beam angle that will result in the least amount of path loss during wireless communication between the pair. The controller can also determine an optimal power level for the pair based on the path loss. The controller can further communicate the optimal antenna beam angle and the optimal power level back to each of the computerized devices in the pair. These computerized devices can subsequently communicate with each other over the wireless network using the specifications (i.e., the optimal antenna beam angle and optimal power level) provided by the controller. Also disclosed herein is an associated method and computer program product for calibrating such wireless signal transmission-reception specifications.

More particularly, referring to FIG. 1, disclosed herein is a communication system 100 enabled for calibrating wireless signal transmission-reception specifications.

This system 100 can comprise multiple computerized devices 110a-d connected to a wireless network 101 (also referred to herein as the data domain or data network). For illustration purposes, four computerized devices 110a-d are shown in FIG. 1; however, it should be understood that any number of two or more computerized devices can be connected to this wireless network 101. The computerized devices 110a-d can comprise, for example, multiple servers within a data center. Alternatively, the computerized devices 110a-b can comprise multiple consumer electronics within a home or office environment. Such consumer electronics can include, but are not limited to, computers, printers, multi-function printing devices, digital video recorders/players, and "smart" TVs.

In any case, the computerized devices 110a-d can comprise radio transceivers 111a-d coupled to antennas 113a-d (also referred to herein, in combination, as radio nodes), respectively, that allow for wireless radio frequency communications between the computerized devices 110a-d on the wireless network 101. The transceivers 111a-d and, thus, the wireless network 101 can operate at a relatively high frequency, for example, in the license-free 57-64 GHz radio frequency spectrum and, preferably, in the 60 GHz radio frequency spectrum. Such high frequency radio signals (e.g., 60 GHz radio signals) allow for multi-gigabit wireless data transfers between the computerized devices 110a-d. However, such high frequency radio signals (e.g., 60 GHz radio signals) typically require line-of-sight (LOS) between communicating transceivers 111a-d. Thus, to optimize wireless network performance, the antennas 113a-d coupled to the transceivers 111a-d can comprise beam forming or horn antennas that provide directional narrow beam signal transmission and reception. Those skilled in the art will recognize that an advantage of using narrow beam signal transmission and reception is that the computerized devices 110a-d can be located within the same facility (e.g., data center, home, office, etc.) and the transmitted signals between each pair of computerized devices on the wireless network 101 (e.g., between computerized devices 110a and 110b, 110a and 110c, 110a and 110d, 110b and 110c and so on) can be isolated based on transmitted signal beam angle differences.

This system 100 can further comprise a controller 120 in communication with the computerized devices 110a-d over an additional network 102 (also referred to herein as the control domain or control network) and, particularly, a different network than the wireless network 101. The additional network 102 can comprise, for example, either a wired network or a second wireless network. If the additional network 102 is a second wireless network, this second wireless network can comprise a low frequency, low bandwidth, wireless network. For example, this second wireless network can operate in the 2-6 GHz radio frequency spectrum. Although not illustrated, it should be understood that the controller 120 and the computerized devices 110a-d each comprise the necessary components to connect to and communicate over the additional network 102. Such components will vary depending upon the type of network (i.e., wired or wireless), but in either case such components are well known in the art and, thus, the details thereof are omitted from this specification in order to allow the reader to focus on the salient aspects of the disclosed system.

The controller 120 can be a discrete computerized device (e.g., a computer, server, etc.), as illustrated. In this case, the controller 120 can be directly connected to the additional network 102 and located within the same facility as the computerized devices 110a-d. Alternatively, the additional network 102 can be Internet-accessible and the controller 120 can be connected to the additional network 102 via the Internet and can be remotely located.

The controller 120 can control (i.e., can be adapted to control, can be configured to control, can be execute a program of instructions stored in memory to control, etc.) communications between the computerized devices 110a-d over the wireless network 101. As a part of this control process, the controller 120 can be enabled to calibrate the wireless signal transmission-reception specifications for the computerized devices 110a-d on the wireless network 101. To this end, the controller 120 can initiate and control (i.e., can be adapted to initiate and control, can be configured to initiate and control, can be execute a program of instructions stored in memory to initiate and control, etc.) performance by the computerized devices 110a-d of antenna beam angle testing of the wireless network 101. Initiation of such testing can be performed on demand of a user (e.g., through a user interface connected to the controller 120) when the computerized devices 110a-d are initially connected to the wireless network 101 (e.g., when the wireless network is established) or at any other time deemed necessary. Additionally or alternatively, initiation of such testing can be performed automatically (e.g., according to a predefined maintenance schedule).

Whether initiation is on demand or automatic, the controller 120 can cause the computerized devices 110a-d to perform antenna beam angle testing of the wireless network 101 in order to acquire transmitted test signal data and corresponding received test signal data. Specifically, in antenna beam angle testing, a first computerized device (e.g., computerized device 110a) and, particularly, the transceiver 111a and antenna 113a thereof, can transmit a test signal at a given power level (i.e., a single transmitted test signal power level), for example, at a given number of decibels to one milliwatt (dBm) or decibels to one Watt (dBM). This transmitted test signal power level can comprise, for example, a maximum power level associated with the transceiver, a manufacturer's recommended power level, or any other preselected power level. In any case, the first computerized device 110a can transmit the test signal at varying signal beam angles. That is, the first computerized device 110 can perform a scanning signal transmission process such that the test signal is transmitted over a range of different transmitted test signal beam angles (e.g., the full range of beam angles available given the configuration of its antenna 113a). Thus, the transmitted test signal data associated with the first computerized device 110a can comprise the transmitted test signal power level and the different test signal beam angles used during the scanning signal transmission process.

As the scanning signal transmission process is performed by the first computerized device 110a, the other computerized devices 110b-d on the wireless network 101 and, particularly, the transceivers 110c-d and antennas 113a-c (i.e., radio nodes) thereof can receive the test signal and can measure and store the different received test signal power levels associated with the different transmitted test signal beam angles. That is, each of the computerized devices 110a-d can comprise a local power meter 112a-d, at least one local processor 115a-d and a local memory 114a-d, respectively. As the scanning signal transmission process is performed by the first computerized device 110a, the power meters 112b-d can measure (i.e., can be adapted to measure, can be configured to measure, etc.) the power level of the received test signal (i.e., the strength of received test signal in, for example, numbers dBm or dBM) at each of the different test signal transmission beam angles. The measured power level can subsequently be used by the controller 120 to determine the path loss between test signal transmission and test signal reception (see detailed discussion below). For purposes of this disclosure, the amount of path loss will be equal to the difference in the power level of a signal when it is transmitted by one computerized device on the wireless network and the power level of that same signal when it is received at another computerized device on the wireless network. Thus, the received test signal data associated with the first computerized device 110a can comprise the received test signal power levels associated with the different test signal beam angles used during the scanning signal transmission process. It should be noted that power meters are well known in the art and, thus, the details thereof are omitted from this specification in order to allow the reader to focus on the salient aspects of the disclosed system.

The processor 115a of the first computerized device 110a can associate the transmitted test signal data with the first computerized device 110 and can either immediately forward it to the controller 120 over the additional network 102 or can store it locally in the memory 114a for subsequent transfer to the controller 120. Similarly, the processors 115b-d can associate the received test signal data (i.e., the received test signal power levels corresponding to the different transmitted test signal beam angles) with the first computerized device 110a and can either immediately forward it to the controller 120 over the additional network 102 or can store it locally in the memories 114b-d, respectively, for subsequent transfer to the controller 120. Subsequent data transfer of the transmitted test signal data and/or the received test signal data to the controller 120 can be, for example, on demand or automatic (e.g., when antenna beam angle testing is complete).

In any case, the scanning signal transmission process can be repeated by other computerized devices (e.g., 110b-d) connected to the wireless network 101 until transmitted and received test signal data is acquired for all pairs of the computerized devices 110a-d and received by the controller 120. It should be noted that since, as mentioned above, such high frequency wireless networks operate using line-of-sight (LOS) transmission and reception, only single direction antenna beam angle testing is required. That is, the received test signal data (i.e., the received test signal power levels corresponding to the different transmitted test signal beam angles) acquired by one computerized device of each pair can be used to derive the received test signal data for the other computerized device in the pair. So, for example, when the first computerized device 110a performs the scanning signal transmission process, all of the other computerized devices 110b-d can acquire the received test signal data, associate it with the first computerized device 110a and store it locally. However, when a second computerized device 110b performs the scanning signal transmission process, only computerized devices 110c-d need to acquire the received test signal data, associate it with the second computerized device 110b and store it local, because the received test signal data for communications between the first and second computerized devices 110a and 110b was already acquired by the second computerized device 110b, and so on. Thus, the required number of power level measurements is minimized. That is, the scanning signal transmission process only needs to be repeated by other computerized devices connected to the wireless network 101 until transmitted and received test signal data is acquired, directly or indirectly, for all pairs of the computerized devices 110a-d.

The controller 120 can receive all the transmitted test signal data and the corresponding received test signal data from the computerized devices 110a-d over the additional network 102, can store it and can further process it to determine the wireless signal transmission-reception specifications for each pair of computerized devices 110a-d. Specifically, the controller 120 can comprise a memory 124 and at least one processor 125 in communication with that memory 124. Upon receipt of the transmitted test signal data and the corresponding received test signal data from the computerized devices 110a-d, the controller 120 and, particularly, the processor 125 thereof can calculate (i.e., can be adapted to calculate, can be configured to calculate, can execute a program of instructions to calculate, etc.) calibration data for wireless communications between the pairs of the computerized devices 110a-d within the wireless network 101 (e.g., between computerized devices 110a and 110b, 110a and 110c, 110a and 110d, 110b and 110c and so on). This calibration data can be based on the transmitted test signal data and the received test signal data from the computerized devices 110*a-d* and can indicate, for each of the pairs (e.g., for computerized devices 110*a* and 110*b*, 110*a* and 110*c*, 110*a* and 110*d*, 110*b* and 110*c* and so on), different path loss amounts associated with different transmitted test signal beam angles and a single transmitted test signal power level. As mentioned above, for purposes of this disclosure, the amount of path loss will be equal to the difference in the power level of a signal when it is transmitted by one computerized device on the wireless network and the power level of that same signal when it is received at another computerized device on the wireless network.

Once the calibration data is calculated, the controller 120 can generate (i.e., can be adapted to generate, can be configured to generate, can execute a program of instructions to generate, etc.) calibration matrices 200A-D corresponding to each of the computerized devices 110*a-d* (see FIGS. 2A-D, respectively), using the calibration data. Each calibration matrix can comprise entries (i.e., cells), which indicate the amount of path loss associated with the received test signal at a given device for a different beam angle used. The controller 120 can store (i.e., can be adapted to store, can be configured to store, can execute a program of instructions to store, etc.) the calibration matrices 200A-D in memory 124.

It should be noted that, if received test signal data (i.e., the received test signal power levels corresponding to the different transmitted test signal beam angles) is acquired for both computerized devices in each pair (i.e., if the received test signal data is acquired in both directions), all of the path loss data entries in the calibration matrix of any given computerized device will be based on actually measured data. However, if the received test signal data is acquired by only a single computerized device in each pair (i.e., if the received test signal data is acquired in only a single direction), the path loss data entries contained in the calibration matrices of any given computerized device can be based on a combination of both actually measured power level data and power level data derived from the received test signal data acquired by another computerized device.

Figure 3:
FIG. 3 is a table illustrating an exemplary optimal beam angle matrix for all of the computerized devices 110a-d in the system of FIG. 1.

Additionally, the controller 120 and, particularly, the processor 125 thereof can analyze (i.e., can be adapted to analyze, can be configured to analyze, can execute a program of instructions to analyze, etc.) the calibration matrices 200A-D to determine, for each pair of computerized devices (e.g., for computerized devices 110*a* and 110*b*, 110*a* and 110*c*, 110*a* and 110*d*, 110*b* and 110*c* and so on), a specific antenna beam angle and, more particularly, an optimal antenna beam angle (e.g., as indicated by number of degrees) that will result in the least amount of path loss during wireless communication between the pair. Optionally, the controller 120 and, particularly, the processor 125 thereof can generate (i.e., can be adapted to generate, can be configured to generate, can execute a program of instructions to generate, etc.) an optimal beam angle matrix 300 covering all pairs of the computerized devices 110*a-d* (see FIG. 3), using the previously determined optimal beam angles, and can store (i.e., can be adapted to store, can be configured to store, can execute a program of instructions to store, etc.) the optimal beam angle matrix 300 in memory 124. It should be understood that, because the optimal beam angle for signal transmission between any two computerized devices will be the same in both directions, the optimal beam angle matrix 300 of FIG. 3 could, alternatively, be reduced to either an upper or lower triangular matrix to avoid the use of redundant cells within the optimal beam angle matrix 300.

In any case, the controller 120 and, particularly, the processor 125 thereof can communicate over the additional network 102 (i.e., can be adapted to communicate over the additional network 102, can be configured to communicate over the additional network 102, can execute a program of instructions to communicate over the additional network, etc.) to each computerized device in a given pair, the specific antenna beam angle (i.e., the optimal beam angle) to be used for wireless communications (i.e., wireless signal transmission-reception) between that given pair. Thus, each computerized device only receives the specific antenna beam angles that it will use to communicate with the other computerized devices on the network, respectively.

Figure 4:
FIG. 4 is a table illustrating an exemplary optimal power level matrix for all of the computerized devices 110a-d in the system of FIG. 1.

In addition, the controller 120 and, particularly, the processor 125 thereof can select (i.e., can be adapted to select, can be configured to select, can execute a program of instructions to select, etc.), for each pair of computerized devices 110*a-d*, a specific power level and, more particularly, an optimal power level for wireless communications (i.e., wireless signal transmission-reception). The optimal power level can be selected such that it is sufficiently high to ensure signal reception given the expected path loss, such that it is higher than a predetermined noise floor and such that it is lower than a predetermined maximum radiation level. It should be understood that the expected path loss for determining the optimal power level is the amount of path loss associated with the selected optimal beam angle, as indicated by the appropriate calibration matrix. Those skilled in the art will recognize that the noise floor refers to combine signal created from all noise sources and unwanted signals, which in the case refers to any signal not being transmitted by the transmitting computerized device. Additionally, the predetermined maximum radiation level maximum can comprise the maximum permissible exposure level as established by the federal communications commission (FCC). Optionally, the controller 120 and, particularly, the processor 125 thereof can generate (i.e., can be adapted to generate, can be configured to generate, can execute a program of instructions to generate, etc.) an optimal power level matrix 400 covering all pairs of the computerized devices 110*a-d* (see FIG. 4), using the previously determined optimal power levels, and can store (i.e., can be adapted to store, can be configured to store, can execute a program of instructions to store, etc.) the optimal power level matrix 400 in memory 124. It should be understood that, because the optimal power level for signal transmission between any two computerized devices will be the same in both directions, the optimal power level matrix 400 of FIG. 4 could, alternatively, be reduced to either an upper or lower triangular matrix to avoid the use of redundant cells within the optimal power level matrix 400.

In any case, as with the optimal antenna beam angle, the controller 120 can communicate, over the additional network 102 (i.e., can be adapted to communicate over the additional network 102, can be configured to communicate over the additional network 102, can execute a program of instructions to communicate over the additional network, etc.) to each computerized device in a given pair, the specific power level (i.e., the optimal power level) to be used for wireless communications (i.e., wireless signal transmission-reception) between that given pair. Thus, each computerized device only receives the specific power levels that it will use to communicate with the other computerized devices on the wireless network 101, respectively.

As mentioned above, each of the computerized devices 110*a-d* can comprise a local memory 114*a-d*, respectively. When a computerized device (e.g., computerized device 110*a*) within a given pair (e.g., a pair computerized devices 110*a* and 110*b*) receives the specific beam angle and, if applicable, the specific power level (i.e., the optimal beam angle and optimal power level) for wireless communication between that pair, the local memory 114a of the computerized device 110a can store that specific beam angle and specific power level such that they are associated with the other computerized device 110b in the pair.

Once each of the computerized devices 110a-d receive and store the appropriate wireless signal transmission-reception specifications (i.e., the optimal antenna beam angle and optimal power level) to be used for wireless communications with any of the other computerized devices connected to the wireless network 101, the computerized devices 110a-d can subsequently communicate with each other over the wireless network 101 using those wireless signal transmission-reception specifications, which were provided by the controller 120.

It should be noted that, for purposes of illustration, the system 100 is described without consideration of environmental conditions (e.g., temperature, multiple computerized devices communicating on the wireless network 101 simultaneously, etc.). However, it is anticipated that different calibration data and, thereby different wireless signal transmission-reception specifications can be acquired for each pair of computerized devices under different environmental conditions. That is, the above-described operations of the computerized devices 110a-d and the controller 120 can be performed under different environmental conditions. The results can be stored in the memory 124 of the controller 120 or, alternatively, can be stored within the local memories 114a-d of the computerized devices 110a-d. In any case the different wireless signal transmission-reception specifications can be associated with the different environmental conditions and a transmitting computerized device can apply the appropriate wireless signal transmission-reception specifications associated with a receiving computerized device and with the current environmental conditions. For example, if the system 100 is sensitive to temperature, the controller 120 can monitor the temperature at the computerized devices 110a-d and, during wireless communications between the computerized devices 110a-d, can direct a transmitting computerized device to use the appropriate calibration data set given the temperature.

It should further be noted that the above-disclosed system 100 has the advantage of being essentially modular in nature such that the addition of a new computerized device or the repositioning of any computerized device (e.g., from one location to another within the facility housing the computerized devices, such as the data center, home or office) does not require the recalibration of all of the wireless signal transmission-reception specifications (i.e., the optimal antenna beam angle and optimal power level) for all of the other computerized devices 110a-d connected to the wireless network 101. Instead additional antenna beam angle testing of the wireless network 101 only need be performed with regard to the additional computerized device, which is either new to the wireless network 101 or newly positioned within the wireless network 101.

Figure 5:
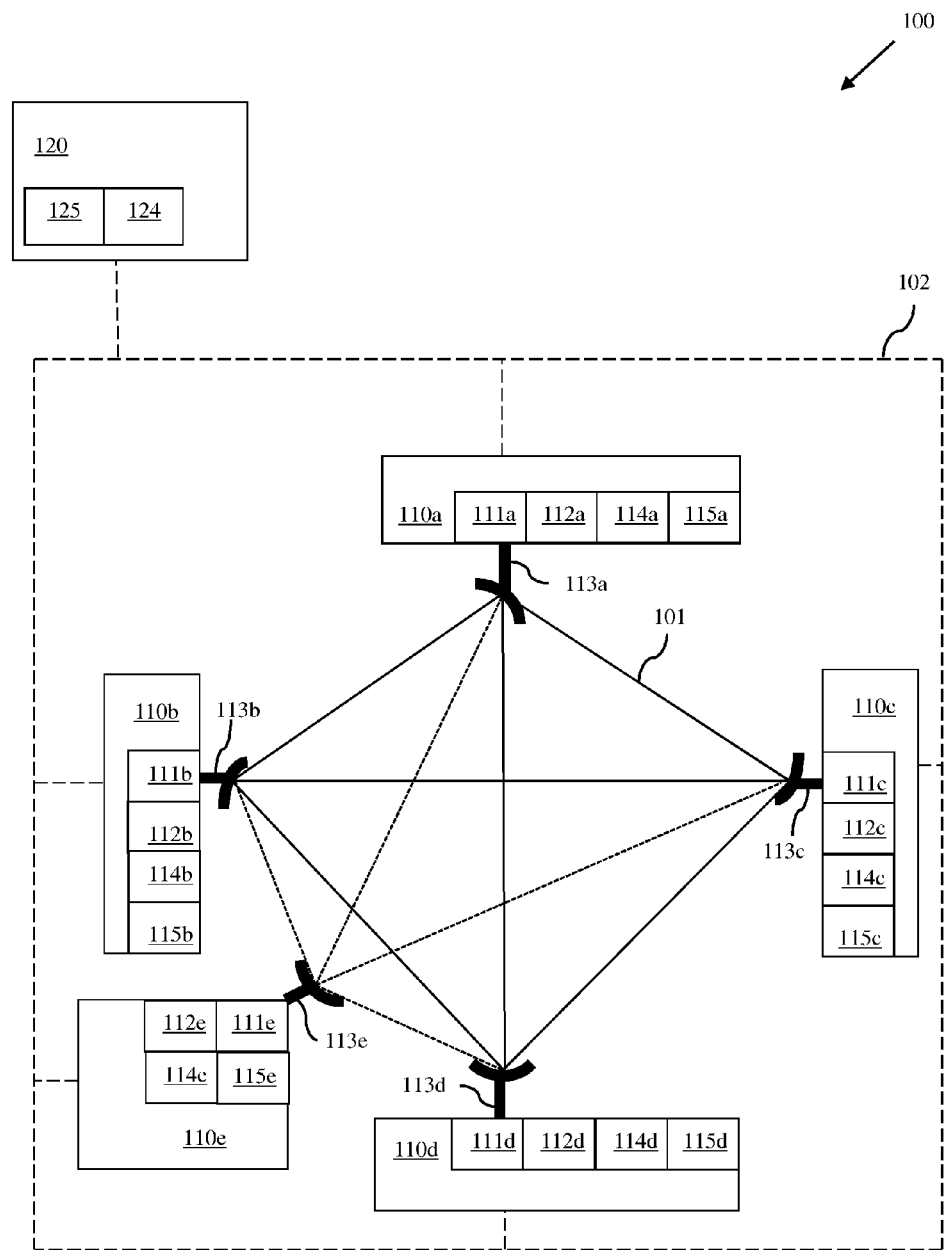
FIG. 5 is a schematic diagram illustrating the communication system of FIG. 1 with an additional computerized device.

For example, FIG. 5 illustrates the system 100 with an additional computerized device 110e connected to the wireless network 101 and connected to the controller 120 over the additional network 102. Like the other computerized devices 110a-d, this additional computerized device 110e can comprise a radio transceivers 111e coupled to an antenna 113e that will allow for wireless radio frequency communications with the computerized devices 110a-d on the wireless network 101. The additional computerized device 110e can also comprise a memory 114e, a power meter 112e and a processor 115e. If this additional computerized device 110e is added to the system 100 after the wireless transmission-receptions specifications have been determined for the computerized device 110a-d, additional antenna beam angle testing directed to this additional computerized device 110e only can be performed. Specifically, the additional computerized device 110e can perform an additional scanning signal transmission process to acquire additional transmitted test signal data and additional received test signal data. The controller 120 can receive the additional transmitted test signal data from the additional computerized device 110e over the additional network 102 and can further receive the additional received test signal data from the other computerized devices 110a-d on the wireless network 101 over the additional network 102. Based on the additional transmitted test signal data and the additional received test signal data, the controller 120 can further calculate additional calibration data associated with the additional computerized device 110e. The controller 120 can further, based on the additional calibration data, generate an additional calibration matrix for the additional computerized device 110e, in the same manner as described in detail above with regard to the original computerized device 110a-d on the wireless network 101 (e.g., see the additional calibration matrix 600 of FIG. 6). The controller 120 can further update the calibration matrices 200A-D of FIGS. 2A-D for those original computerized devices 110a-d (e.g., by adding a column for the power level at the additional computerized device 110e) and any of the other matrices (e.g., the optimal beam angle matrix 300 of FIG. 3 and/or the optimal power level matrix 400 of FIG. 4 by adding a row for the additional computerized device 110e) such that these matrices include data entries (i.e., cells) for the additional computerized device 110e, can determine additional wireless signal transmission-reception specifications (i.e., the optimal antenna beam angle and optimal power level) for each pair that includes the additional computerized device 110e (e.g., for pair 110a and 110e, pair 110b and 110e, and so on) and can communicate these specifications to the additional computerized device 110e and the original computerized devices 110a-d, as appropriate. Furthermore, removal of any computerized device from the wireless network 101 does not require any additional processing with regard to calibration and data entries associated with the removed computerized device can simply be ignored or deleted.

Finally, it should be noted that, since the controller 120 of the system 100 has a memory 124 that stores the calibration matrices 200A-D for each of the computerized devices 110a-d connected to the wireless network 101 (see FIGS. 2A-D) and, optionally, the optimal beam angle matrix 300 (see FIG. 3) and optimal power level matrices (see FIG. 4), this controller 120 can also be enabled to perform verification processing and network performance monitoring. That is, during an operational mode, when the computerized devices 110a-d are engaging in wireless communications over the wireless network 101 using the previously determined wireless signal transmission-reception specifications, a transmitting computerized device (e.g., computerized device 110a) can forward transmitted operational signal data, including the operational signal power level and beam angle, over the additional network 102 to the controller 120. Additionally, the local power meter (e.g., 112b) of a receiving computerized device (e.g., 110b) can measure (i.e., can be adapted to measure, can be configured to measure, etc.) the power level of a received operational signal for verification purposes. The receiving computerized device 110b can forward received operational signal data over the additional network 102 to the controller 120. The controller 120, which receives the transmitted operational signal data and the received operational signal data, and, particularly, the processor 125 thereof can calculate (i.e., can be adapted to calculate, can be configured to calculate, can execute a program of instructions to calculate, etc.) verification data, based on the transmitted operational signal data and the received operation signal data. For example, the controller 120 can calculate the actual path loss as the difference between the transmitted operational signal power level and the received operational signal power level. The controller 120 can further compare (i.e., can be adapted to compare, can be configured to compare, can execute a program of instructions to compare, etc.) the verification data to the previously acquired calibration data, which is stored in the calibration matrices 200A-D of FIGS. 2A-D, optimal beam angle matrix 300 of FIG. 3 and/or the optimal power level matrix 400 of FIG. 4, in order to verify that the wireless signal transmission-reception specifications being used are accurate and/or to monitor any changes in the wireless network 101. For example, any difference between the actual path loss and the expected path loss, as indicated by the calibration data, may indicate a defect in one or more of the transceivers and/or antennas at issue.

Figure 7:
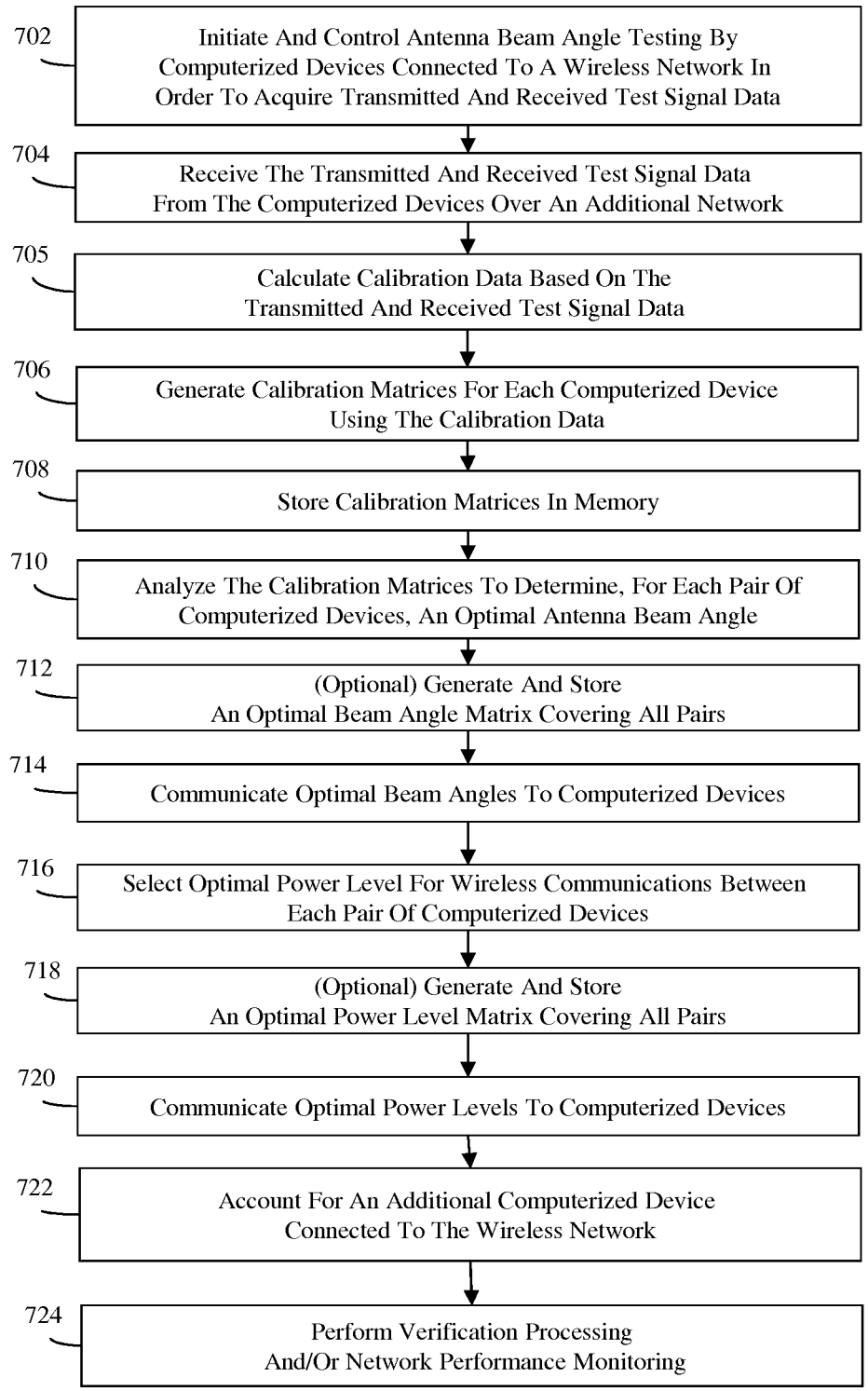
FIG. 7 is a flow diagram illustrating a method calibrating wireless signal transmission-reception specifications.

Referring to the flow diagram of FIG. 7 in combination with FIG. 1, also disclosed herein is a method for calibrating wireless signal transmission-reception specifications for multiple computerized devices 110a-d connected to a wireless network 101 (also referred to herein as a data domain or data network) in a wireless communication system 100, as described in detail above. This wireless network 101 can comprise, for example, a high frequency, high bandwidth, wireless network. These computerized devices 110a-d can also be in communication with a controller 120 over an additional network 102 (also referred to herein as a control domain or control network). The additional network 102 can comprise, for example, either a wired network or a second wireless network. If the additional network 102 is a second wireless network, this second wireless network can comprise a low frequency, low bandwidth, wireless network. For illustration purposes, four computerized devices 110a-d are shown in FIG. 1; however, it should be understood that any number of two or more computerized devices could be connected to this wireless network 101. The computerized devices 110a-d can comprise, for example, multiple servers within a data center. Alternatively, the computerized devices 110a-b can comprise multiple consumer electronics within a home or office environment. Such consumer electronics can include, but are not limited to, computers, printers, multi-function printing devices, digital video recorders/players, and "smart" TVs.

In any case, the method disclosed herein and illustrated in the flow diagram of FIG. 7 relates to processes used by the controller 120 during calibration of wireless signal transmission-reception specifications for the multiple computerized devices 110a-d so that these devices can communicate wirelessly. To this end, the method can comprise initiating and controlling, by the controller 120, performance by the computerized devices 110a-d of antenna beam angle testing of the wireless network 101(702). Initiation of such testing can be performed on demand of a user (e.g., through a user interface connected to the controller 120) when the computerized devices 110a-d are initially connected to the wireless network 101 (e.g., when the wireless network is established) or at any other time deemed necessary. Such testing is performed in order to acquire transmitted test signal data and corresponding received test signal data.

Specifically, this antenna beam angle testing can be performed by the computerized devices 110a-b as follows. A scanning signal transmission process can be performed by a first computerized device (e.g., computerized device 110a). During this scanning signal transmission process, a test signal is transmitted by the first computerized device (e.g., computerized device 110a) and, particularly, by the transceiver 111a and antenna 113a thereof using a given power level (i.e., a single transmitted test signal power level), for example, at a given number of dBm or dBM. This transmitted test signal power level can comprise, for example, a maximum power level, a manufacturer's recommended power level, or any other preselected power level. In any case, the test signal is transmitted by the first computerized device 110a at varying signal beam angles such that a range of different transmitted test signal beam angles is used. Thus, the transmitted test signal data associated with the first computerized device 110a can comprise the transmitted test signal power level and the different test signal beam angles used during the scanning signal transmission process.

As the scanning signal transmission process is performed by the first computerized device 110a, the other computerized devices 110b-d on the wireless network 101 and, particularly, the transceivers 110c-d and antennas 113a-c (i.e., radio nodes) thereof can receive the test signal and can measure and store the different received test signal power levels associated with the different transmitted test signal beam angles. That is, as discussed in detail above with regard to the system 100, each of the computerized devices 110a-d can comprise a local power meter 112a-d, at least one local processor 115a-d and a local memory 114a-d, respectively. As the scanning signal transmission process is performed by the first computerized device 110a, the power level of the received test signal (i.e., the strength of the received test signal in, for example, numbers dBm or dBM) at each of the different signal transmission beam angles can be measured by the power meters 112b-d and these measured power levels can, subsequently, be used to determine the path loss between signal transmission and signal reception. Thus, the received test signal data associated with the first computerized device 110a can comprise the received test signal power levels associated with the different test signal beam angles used during the scanning signal transmission process.

The transmitted test signal data can be associated with the first computerized device 110a and can either be immediately forwarded to the controller 120 over the additional network 102 or can be stored locally in memory 114a for subsequent transfer to the controller 120. Similarly, the received test signal data can be associated with the first computerized device 110a and can either be immediately forwarded by the computerized devices 110b-d to the controller 120 over the additional network 102 or can be store locally in memories 114b-d, respectively, for subsequent transfer to the controller 120. Subsequent data transfer to the controller 120 can be, for example, on demand or automatic (e.g., when antenna beam angle testing is complete). In any case, such a scanning signal transmission process can be repeated by other computerized devices on the wireless network 101 until transmitted and received test signal data is acquired for all pairs of the computerized devices 110a-d and received by the controller 120.

It should be noted that since, as mentioned above, such high frequency wireless networks operate using line-of-sight (LOS) transmission and reception, only single direction antenna beam angle testing is required. That is, the received test signal data (i.e., the received test signal power levels corresponding to the different transmitted test signal beam angles) acquired by one computerized device of each pair can used to derive the received test signal data for the other computerized device in the pair. So, for example, when the scanning signal transmission process is performed by the first computerized device 110a, all of the other computerized devices 110b-d can acquire the received test signal data, associate it with the first computerized device 110a and store it locally. However, when subsequently a scanning signal transmission process is performed by the second computerized device 110b, only computerized devices 110c-d need to acquire the received test signal data, associate it with the second computerized device 110b and store it local, because the received test signal data for communications between the first and second computerized devices 110a and 110b was already acquired by the second computerized device 110b, and so on. Thus, the required number of power level measurements is minimized. That is, the scanning signal transmission process only needs to be repeated by other computerized devices connected to the wireless network 101 until transmitted and received test signal data is acquired, directly or indirectly, for all pairs of the computerized devices 110a-d.

Referring again to the flow diagram of FIG. 7 in combination with FIG. 1, in the method the transmitted test signal data and the received test signal data can be received by the controller 120 from the computerized devices 110a-d over the additional network 102, can be stored in memory 124 of the controller 120 and can further be processed by at least one processor 125 of the controller 120 to determine the wireless signal transmission-reception specifications for each pair of computerized devices 110a-d (704). Specifically, the method can further comprise calculating, by the controller 120, calibration data for wireless communications between the pairs of the computerized devices 110a-d within the wireless network 101 (e.g., between computerized devices 110a and 110b, 110a and 110c, 110a and 110d, 110b and 110c and so on) (705). This calibration data can be calculated based on the transmitted test signal data and the received test signal data from the computerized devices 110a-d and can indicate, for each of the pairs (e.g., for computerized devices 110a and 110b, 110a and 110c, 110a and 110d, 110b and 110c and so on), different path loss amounts associated with different transmitted test signal beam angles and a single transmitted test signal power level. As mentioned above, for purposes of this disclosure, the amount of path loss will be equal to the difference in the power level of a signal when it is transmitted by one computerized device on the wireless network and the power level of that same signal when it is received at another computerized device on the wireless network.

Next, the method can comprise generating, by the controller 120, calibration matrices 200A-D corresponding to each of the computerized devices 110a-d (706, see FIGS. 2A-D, respectively). These calibration matrices 200A-D can specifically be generated based on the calibration data calculated at process 705. Furthermore, each calibration matrix can comprise entries (i.e., cells), which indicate the amount of path loss associated with the received test signal at a given device for a different beam angle used. These calibration matrices 200A-D can be stored in memory 124 (708).

It should be noted that, if received test signal data (i.e., the received test signal power levels corresponding to the different transmitted test signal beam angles) is acquired for both computerized devices in each pair (i.e., if received test signal data is acquired in both directions), all of the path loss data entries in the calibration matrix of any given computerized device will be based on actually measured data. However, if the received test signal data is acquired by only a single computerized device in each pair (i.e., if the received test signal data is acquired in only a single direction), the path loss data entries contained in the calibration matrices of any given computerized device can be based on a combination of both actually measured power level data and power level data derived from the received test signal data acquired by another computerized device.

Next, the calibration matrices 200A-D can be analyzed, by the controller 120, to determine, for each pair of computerized devices (e.g., for computerized devices 110a and 110b, 110a and 110c, 110a and 110d, 110b and 110c and so on), a specific antenna beam angle and, more particularly, an optimal antenna beam angle (e.g., as indicated by number of degrees) that will result in the least amount of path loss during wireless communication between the pair (710). Optionally, an optimal beam angle matrix 300 can be generated, by the controller 120 using the previously determined optimal beam angles, and stored in memory 124 (712, see FIG. 3). This optimal beam angle matrix 300 can cover all pairs of the computerized devices 110a-d. It should be understood that because the optimal beam angle for signal transmission between any two computerized devices will be the same in both directions, the optimal beam angle matrix 300 of FIG. 3 could, alternatively, be reduced to either an upper or lower triangular matrix to avoid the use of redundant cells within the optimal beam angle matrix 300. In any case, the specific antenna beam angle (i.e., the optimal beam angle) to be used for wireless communications (i.e., wireless signal transmission-reception) between each given pair can be communicated, by the controller 120 over the additional network 102, to each computerized device in that given pair (714). Thus, each computerized device only receives the specific antenna beam angles that it will use to communicate with the other computerized devices on the network, respectively.

In addition, a specific power level and, more particularly, an optimal power level for wireless communications (i.e., wireless signal transmission-reception) can be selected, by the controller 120, for each pair of computerized devices 110a-d (716). The optimal power level can be selected such that it is sufficiently high to ensure signal reception given the expected path loss, such that it is higher than a predetermined noise floor and such that it is lower than a predetermined maximum radiation level. It should be understood that the expected path loss for determining the optimal power level is the amount of path loss associated with the selected optimal beam angle, as indicated by the appropriate calibration matrix. Those skilled in the art will recognize that the noise floor refers to combine signal created from all noise sources and unwanted signals, which in the case refers to any signal not being transmitted by the transmitting computerized device. Additionally, the predetermined maximum radiation level maximum can comprise the maximum permissible exposure level as established by the federal communications commission (FCC). Optionally an optimal power level matrix 400 covering all pairs of the computerized devices 110a-d can be generated, by the controller 120 using the previously determined optimal power levels, and stored in memory 124 (718, see FIG. 4). It should be understood that because the optimal power level for signal transmission between any two computerized devices will be the same in both directions, the optimal power level matrix of FIG. 4 could, alternatively, be reduced to either an upper or lower triangular matrix to avoid the use of redundant cells within the optimal power level matrix 400. In any case, the specific power level (i.e., the optimal power level) to be used for wireless communications (i.e., wireless signal transmission-reception) between a given pair can be communicated, by the controller 120 over the additional network 102 to each computerized device in that given pair (720). Thus, each computerized device only receives the specific power levels that it will use to communicate with the other computerized devices on the wireless network 101, respectively.

It should be noted that when a computerized device (e.g., computerized device 110a) within a given pair (e.g., pair computerized devices 110a and 110b) receives the specific beam angle and, if applicable, the specific power level (i.e., the optimal beam angle and optimal power level) for wireless communication between that pair, the local memory 114a of the computerized device 110a can store that specific beam angle and specific power level such that they are associated with the other computerized device 110b in the pair. Furthermore, once each of the computerized devices 110a-d receive and store the appropriate wireless signal transmission-reception specifications (i.e., the optimal antenna beam angle and optimal power level) to be used for wireless communications with any of the other computerized devices connected to the wireless network 101, the computerized device 110a-d can subsequently communicate with each other over the wireless network 101 using those wireless signal transmission-reception specifications, which were determined and provided, according to this method.

It should be noted that, for purposes of illustration, the method is described without consideration of environmental conditions (e.g., temperature, multiple computerized devices communicating on the wireless network 101 simultaneously, etc.). However, it is anticipated that different calibration data and, thereby different wireless signal transmission-reception specifications can be acquired for each pair of computerized devices under different environmental conditions. That is, the above-described processes performed by the computerized devices 110a-d and the controller 120 can be performed under different environmental conditions. The results can be stored in the memory 124 of the controller 120 or, alternatively, can be stored within the local memories 114a-d of the computerized devices 110a-d. In any case the different wireless signal transmission-reception specifications can be associated with the different environmental conditions and a transmitting computerized device can apply the appropriate wireless signal transmission-reception specifications associated with a receiving computerized device and with the current environmental conditions. For example, the temperature at the computerized devices 110a-d can be monitored and, during wireless communications between the computerized devices 110a-d on the wireless network, the computerized devices 110a-d can be directed to use the appropriate calibration data given the temperature.

The method can further comprise accounting for any additional computerized devices that are either new to the wireless network 101 (e.g., see additional computerized device 110e of FIG. 5 and detailed discussion above) or newly positioned within the wireless network 101 (722). The above-described method has the advantage of limiting the number of measurements required for calibrating the wireless signal transmission-reception specifications when a new computerized device is added to the wireless network 101 or any computerized device on the wireless network 101 is repositioned (e.g., from one location to another within the facility housing the computerized devices, such as the data center, home or office). Specifically, additional antenna beam angle testing of the wireless network 101 need only be performed with regard to any additional computerized device, which is either new to the wireless network 101 (as illustrated in FIG. 5) or newly positioned within the wireless network 101.

Figure 6:
FIG. 6 is a table illustrating an exemplary additional calibration matrix corresponding to the additional computerized devices 110e in the system of FIG. 5.

In this additional antenna beam angle testing, the additional computerized device 110e can perform an additional scanning signal transmission process to acquire additional transmitted test signal data and additional received test signal data. In this case, the additional transmitted test signal data can be received, by the controller 120, from the additional computerized device 110e over the additional network 102 and the additional received test signal data can be received, by the controller 120, from the other computerized devices 110a-d on the wireless network 101 over the additional network 102. Based on the additional transmitted test signal data and the additional received test signal data, additional calibration data associated with the additional computerized device 110e can be calculated by the controller 120. Then, based on the additional calibration data, an additional calibration matrix 600, as shown in FIG. 6, for the additional computerized device 110e can be generated, by the controller 120, in the same manner as described in detail above with regard to the original computerized device 110a-d on the wireless network 101. Furthermore, the computer matrices 200A-D of FIGS. 2A-2D for the original computerized devices 110a-d can be updated (e.g., with a column for the power level at the additional computerized device 110e) and any of the other matrices (e.g., the optimal beam angle matrix 300 of FIG. 3 and/or the optimal power level matrix 400 of FIG. 4) can be updated (e.g., with a row corresponding to the additional computerized device 110e) such that these matrices include the data entries (i.e., cells) for the additional computerized device 110e; additional wireless signal transmission-reception specifications (i.e., the optimal antenna beam angle and optimal power level) for each pair that includes the additional computerized device 110e (e.g., for pair 110a and 110e, 110b and 110e, and so on) can be determined; and these specifications can be communicated to the additional computerized device 110e and the original computerized devices 110a-d, as appropriate. Removal of any computerized device from the wireless network 101 does not require any additional processing with regard to calibration and data entries associated with the removed computerized device can simply be ignored or deleted.

Finally, it should be noted that, since the method described above stores the calibration matrices 200A-D for each of the computerized devices 110a-d connected to the wireless network 101 (see FIGS. 2A-D) and, optionally, the optimal beam angle matrix 300 (see FIG. 3) and optimal power level matrices (see FIG. 4) in the memory 124 within the controller 120, the method can also comprise using, by the controller 120, these matrices 200A-D, 300 and/or 400 to perform verification processing and/or network performance monitoring (724). Specifically, during an operational mode, when the computerized devices 110a-d are engaging in wireless communications over the wireless network 101 using the previously determined wireless signal transmission-reception specifications, a transmitting computerized device (e.g., computerized device 110a) can forward transmitted operational signal data, including the transmitted operational signal power level and beam angle, over the additional network 102 to the controller 120. Additionally, the local power meter (e.g., power meter 112b) of a receiving computerized device (e.g., 110b) can measure the power level of the received operational signal for verification purposes. The measured operational signal power level (also referred to herein as received operational signal data) can then be communicated by the computerized device 110b over the additional network 102 to the controller 120. The method can comprise receiving, by the controller 120 from the computerized devices 110a-b over the additional network 102, the transmitted operational signal data and the received operational signal and calculating, by the controller 120, verification data based on the transmitted operational signal data and received operational signal data. For example, the actual path loss can be calculated as the difference between the transmitted operational signal power level and the received operational signal power level. This verification data can then be compared to the previously acquired calibration data, which is stored in the calibration matrices 200A-D of FIGS. 2A-D, optimal beam angle matrix 300 of FIG. 3 and/or the optimal power level matrix 400 of FIG. 4, in order to verify the wireless signal transmission-reception specifications being used and/or to monitor any changes in the wireless network 101. For example, any difference between the actual path loss and the expected path loss, as indicated by the calibration data, may indicate a defect in one or more of the transceivers and/or antennas at issue.

Also, disclosed herein is a computer program product. This computer program product can comprise a computer readable storage medium. The computer readable storage medium can store instructions that are executable by a computer to perform the above-described method, as illustrated in the flow diagram of FIG. 7, for calibrating wireless signal transmission-reception specifications for multiple computerized devices connected to a wireless network (e.g., a high frequency, high bandwidth, wireless network). More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage device or a computer readable signal medium. A computer readable storage device is tangible and may be, but is not limited to, any of the following: an electronic, magnetic, optical, electromagnetic, infrared, or semiconductor system, apparatus, or device, or any suitable combination of the foregoing. More specific examples (a non-exhaustive list) of the computer readable storage device would include, but is not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electromagnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 8:
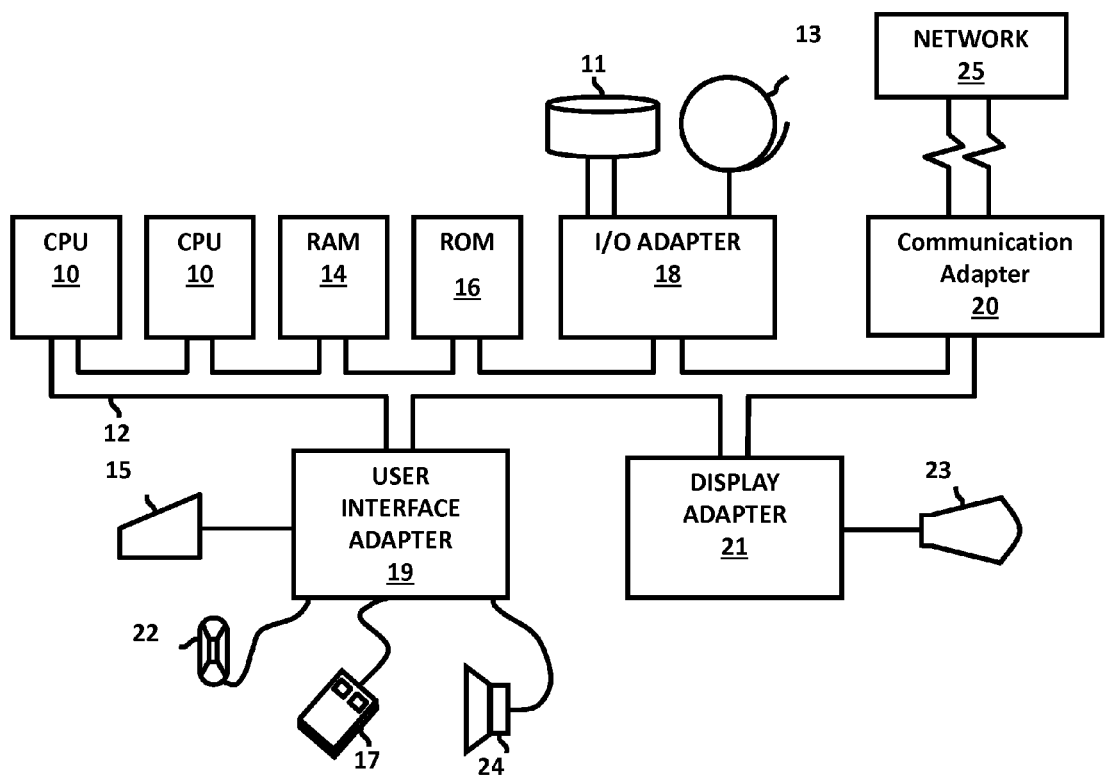
FIG. 8 is a schematic diagram illustrating an exemplary hardware configuration that can be used in the implementation of the system or method disclosed herein.

FIG. 8 is representative hardware environment for implementing the controller 120 and, optionally, any of the computerized devices 110a-d in the above-described system 100 of FIG. 1 and/or for implementing the above-described method of FIG. 7 (e.g., by executing instructions stored on a computer readable medium of a computer program product). This schematic drawing illustrates a hardware configuration of a computerized device, such as an information handling/computer system. The computerized device comprises at least one processor or central processing unit (CPU) 10. The CPUs 10 are interconnected via bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the computerized device. The computerized device can read the inventive instructions on the program storage devices and follow these instructions to execute the methodology of the disclosed embodiments. The computerized device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowcharts and block diagrams in the Figures referenced above illustrate the architecture, functionality, and operation of the various possible implementations of the disclosed communication systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in any block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that the terminology used herein is for the purpose of describing the communication systems, methods and computer program products disclosed and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including", specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The above-description has been presented for purposes of illustration, but is not intended to be exhaustive or limiting. Many modifications and variations to the structures and methods will be apparent to those of ordinary skill in the art without departing from the scope and spirit of those structures and methods.

Therefore, disclosed above is a communication system enabled for calibrating wireless signal transmission-reception specifications. Specifically, the system can comprise computerized devices, which are connected to a wireless network (e.g., a high frequency wireless network), and a controller in communication with the computerized devices over an additional network (e.g., a wired network or a lower frequency wireless network). The computerized devices can perform antenna beam angle testing of the wireless network in order to acquire transmitted and received test signal data. The controller can receive the transmitted and received test signal data from the computerized devices over the additional network. The controller can further calculate calibration data, based on the transmitted and received test signal data. This calibration data can indicate, for each pair of computerized devices, different path loss amounts associated with different transmitted test signal beam angles and a single transmitted test signal power level. The controller can then generate calibration matrices corresponding to each of computerized devices using the calibration data and can analyze the calibration matrices to determine, for each pair, an optimal antenna beam angle that will result in the least amount of path loss during wireless communication between the pair. The controller can also determine an optimal power level for the pair based on the path loss. The controller can further communicate the optimal antenna beam angle and the optimal power level back to each of the computerized devices in the pair. These computerized devices can subsequently communicate with each other over the wireless network using the specifications (i.e., the optimal antenna beam angle and optimal power level) provided by the controller. Also disclosed herein is an associated method and computer program product for calibrating such wireless signal transmission-reception specifications. The above-described system, method and computer program product are beneficial in that they harness the processing power of a control unit for wireless signal transmission-reception specification calibration and verification purposes, thereby making such calibration and verification procedures faster and more efficient. Furthermore, because a single controller performs much of the processing and data storage required for the calibrating wireless signal transmission-reception specifications, processing and/or memory upgrades do not need to be made to the individual computerized devices connected to the wireless network as new computerized devices are connected to the wireless network, thereby making such calibration and verification procedures more scalable.

What is claimed is:

1. A communication system comprising:
   multiple computerized devices connected to a wireless network; and
   a controller in communication with said multiple computerized devices over an additional network,
   said computerized devices performing antenna beam angle testing, and
   said controller performing the following:
      receiving, from said computerized devices over said additional network, transmitted test signal data and received test signal data, acquired by said computerized devices during antenna beam angle testing;
      calculating, based on said transmitted test signal data and said received test signal data, calibration data for wireless communications between pairs of said computerized devices within said wireless network, said calibration data indicating, for each of said pairs, different path loss amounts associated with different transmitted test signal beam angles and a single transmitted test signal power level;
      generating calibration matrices corresponding to said computerized devices using said calibration data;
      analyzing said calibration matrices to determine, for each pair, a specific antenna beam angle that will result in a least amount of path loss; and
      communicating said specific antenna beam angle to said pair over said additional network.

2. The communication system of claim 1, said controller further selecting, for said pair, a specific power level for said wireless communication between said pair, said specific power level being sufficiently high to ensure signal reception given an expected path loss, being higher than a predetermined noise floor and being lower than a predetermined maximum radiation level.

3. The communication system of claim 2,
said controller communicating said specific power level to said pair over said additional network, and
each computerized device in said pair comprising a local memory that stores said specific antenna beam angle and said specific power level such that said specific antenna beam angle and said specific power level are associated with another computerized device in said pair.

4. The communication system of claim 1, said additional network comprising a second wireless network operating at a lower frequency than said wireless network.

5. The communication system of claim 1, said additional network comprising a wired network.

6. The communication system of claim 1, said antenna beam angle testing being performed in a single direction between each of said pairs.

7. The communication system of claim 1, said controller being remotely located.

8. The communication system of claim 1, said antenna beam angle testing being performed under different environmental conditions to acquire different calibration data.

9. The communication system of claim 1,
said computerized devices further performing additional antenna beam angle testing, when an additional computerized device is added to said network, and
said controller further performing the following:
during said additional antenna beam angle testing, receiving additional transmitted test signal data and additional received test signal data from said additional computerized device and said computerized devices over said additional network;
calculating, based on said additional transmitted test signal data and said additional received test signal data, additional calibration data associated with said additional computerized device; and
based on said additional calibration data, generating an additional calibration matrix for said additional computerized device and updating said calibration matrices.

10. The communication system of claim 1,
said computerized devices further engaging in said wireless communications, and
said controller further performing the following:
during said wireless communications, receiving transmitted operational signal data and received operational signal data from said computerized devices over said additional network;
calculating, based on said transmitted operational signal data and said received operational signal data, verification data; and
comparing said verification data to said calibration data to monitor changes in said wireless network.

11. A method for calibrating wireless signal transmission-reception specifications for multiple computerized devices connected to a wireless network, said method comprising:
receiving, by a controller from said computerized devices over an additional network, transmitted test signal data and received test signal data acquired by said computerized devices during antenna beam angle testing;
calculating, by said controller based on said transmitted test signal data and said received test signal data, calibration data for wireless communications between pairs of said computerized devices within said wireless network, said calibration data indicating, for each of said pairs, different path loss amounts associated with different transmitted test signal beam angles and a single transmitted test signal power level;
generating, by said controller and using said calibration data, calibration matrices corresponding to said computerized devices;
analyzing, by said controller, said calibration matrices to determine, for each pair, a specific antenna beam angle that will result in a least amount of path loss; and
communicating, by said controller, said specific antenna beam angle to said pair over said additional network.

12. The method of claim 11, further comprising selecting, by said controller for said pair, a specific power level for said wireless communication between said pair, said specific power level being sufficiently high to ensure signal reception given an expected path loss, being higher than a predetermined noise floor and being lower than a predetermined maximum radiation level.

13. The method of claim 12, further comprising: communicating, by said controller, said specific power level to said pair over said additional network, wherein each computerized device in said pair comprises a local memory that stores said specific antenna beam angle and said specific power level such that said specific antenna beam angle and said specific power level are associated with another computerized device in said pair.

14. The method of claim 11, said additional network comprising a second wireless network operating at a lower frequency than said wireless network.

15. The method of claim 11, said additional network comprising a wired network.

16. The method of claim 11, said antenna beam angle testing being performed in single direction between each of said pairs.

17. The method of claim 11, said antenna beam angle testing being performed under different environmental conditions to acquire different calibration data.

18. The method of claim 11, further comprising:
during additional antenna beam angle testing performed by an additional computerized device and said computerized devices when said additional computerized device is added to said wireless network, receiving, by said controller, additional transmitted test signal data and additional received test signal data from said additional computerized device and said computerized devices over said additional network;
calculating, by said controller based on said additional transmitted test signal data and said additional received test signal data, additional calibration data associated with said additional computerized device;
based on said additional calibration data, generating, by said controller, an additional calibration matrix for said additional computerized device; and
updating, by said controller, said calibration matrices.

19. The method of claim 11, further comprising:
during engagement by said computerized devices of said wireless communications, receiving, by said controller over said additional network, transmitted operational signal data and received operational signal data from said computerized devices;
calculating, by said controller based on said transmitted operational signal data and said received operational signal data, verification data; and
comparing, by said controller, said verification data to said calibration data to monitor changes in said wireless network.

20. A computer program product comprising a computer-readable storage medium, said computer-readable storing instructions executable by a computer to perform a method for calibrating wireless signal transmission-reception specifications for multiple computerized devices connected to a wireless network, said method comprising:
- receiving, from said computerized devices over an additional network, transmitted test signal data and received test signal data acquired by said computerized devices during antenna beam angle testing;
- calculating, based on said transmitted test signal data and said received test signal data, calibration data for wireless communications between pairs of said computerized devices within said wireless network, said calibration data indicating, for each of said pairs, different path loss amounts associated with different transmitted test signal beam angles and a single transmitted test signal power level;
- generating calibration matrices corresponding to said computerized devices using said calibration data;
- analyzing said calibration matrices to determine, for each pair, a specific antenna beam angle that will result in a least amount of path loss; and
- communicating said specific antenna beam angle to said pair over said additional network.

* * * * *